Sept. 29, 1959  J. Z. DE LOREAN  2,906,105
UNIVERSAL JOINT
Filed Nov. 24, 1958  2 Sheets-Sheet 1

INVENTOR.
John Z. DeLorean
BY
D. D. Burch
ATTORNEY

Sept. 29, 1959   J. Z. DE LOREAN   2,906,105
UNIVERSAL JOINT

Filed Nov. 24, 1958   2 Sheets-Sheet 2

INVENTOR.
John Z. DeLorean
BY
L. D. Burch
ATTORNEY

United States Patent Office 2,906,105
Patented Sept. 29, 1959

2,906,105

UNIVERSAL JOINT

John Z. De Lorean, Birmingham, Mich., assignor to General Motors Corporation, Detroit, Mich., a corporation of Delaware Application November 24, 1958, Serial No. 775,813

7 Claims. (Cl. 64—8)

This invention relates to universal joints and more particularly to the type of universal joint having a housing with axial openings therein, and a shaft and trunnion and bearing assembly receivable in the housing, to allow relative axial movement between the input and output shafts.

Axially slidable universal joints have become well known in the automotive industry and are adaptable to a wide range of uses. In the generally known universal joint, a housing is provided having a central shaft receiving bore and a pair of spaced bearing receiving bores communicating with the central opening. A shaft extends into the central opening and has a trunnion and bearing assembly mounted in the end thereof, the bearing caps being received in the spaced openings. As relative axial movement takes place between the input and output shafts the bearing caps rotate or slide within the spaced opening. A thrust button may be provided in the joint to retain contact at all times between the bearing assembly and the outer wall of the housing. With axial movement, or any movement, between the bearing assembly and the housing the thrust buttons slide along the surface of the outer wall and it is obvious that rapid wear takes place both in the thrust button and in the housing. This necessitates replacement of the parts, or replacement of the entire joint, in either case requiring complete disassembly of the vehicle drive line. The manufacturer is thus required to spend large sums of money and a great deal of time in making replacement parts and the automobile owner is deprived of the use of the automobile during the time the parts are being replaced.

The device in which this invention is embodied comprises generally a universal joint of the type described but having improvements in the joint housing and in the bearing assembly to eliminate the above mentioned difficulties. The bearing receiving openings are provided with cam surfaces engaging the thrust button caps at a single point, such that the caps will rotate along the surface when relative movement occurs between the two, eliminating the metal-to-metal sliding and the resultant wear and friction. The bearing assembly and bearing cap are improved to provide relatively frictionless rotation and to maintain proper contact between the outer wall of the joint housing and the bearing cap.

Thus, a universal joint is provided that decreases manufacturing costs in replacement parts and labor, and a joint improved in function and operation. These and other advantages will become more apparent from the following description and drawings in which.

Figure 1:
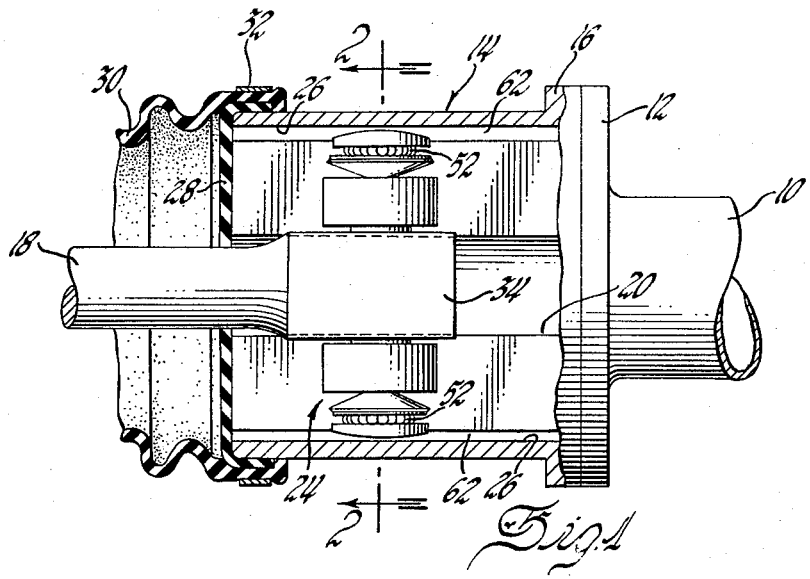
Figure 1 is an elevational view of a universal joint embodying the invention with parts broken away, and in section to illustrate the relative location of the various parts.

Referring more particularly to the drawings, Figure 1 best illustrates the over-all universal joint. A portion of a drive shaft 10 is shown having an annular flange 12 forming a part thereof, the flange serving as a connecting plate for the universal joint housing, illustrated generally by the numeral 14. The housing has an annular flange 16 to cooperate with the drive shaft flange 12 and secure the housing to the drive shaft 10. Thus, rotation of the shaft 10 will also impart rotation to the housing 14.

An output shaft 18 extends into the housing 14 and into the central shaft receiving opening 20. The trunnion and bearing assembly, illustrated generally by the numeral 24, is shown positioned at the end of the shaft 18 within the housing and extending into the bearing assembly receiving openings 26 on either side of the central opening 20. The structure of the trunnion and bearing assembly will be more fully described below.

An oil seal 28 and a boot 30 are received over the end of the housing 14, the boot and the oil seal being retained thereon by a retaining ring 32. The boot and oil seal prevent dirt and foreign material from entering the joint and allow for lubrication of the joint without excessive leakage along the shaft 18.

Figure 2:
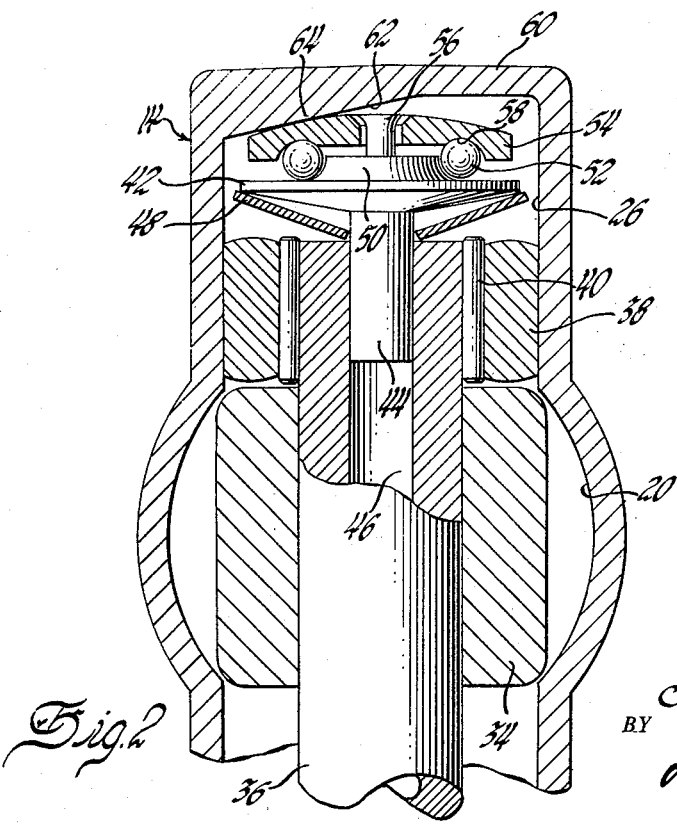
Figure 2 is a cross sectional view of the universal joint shown in Figure 1 taken substantially along the line 2—2 and looking in the direction of the arrows to illustrate a modification of the trunnion and bearing assembly.

Referring to Figure 2, the trunnion and bearing assembly are shown secured in the enlarged portion 34 of the shaft portion 18. The trunnion shaft 36 extends through the shaft enlargement 34 and into the shaft receiving openings 26. Bearing sleeves 38 are disposed about each end of the trunnion shaft 36 and engage the side walls of the opening 26. An annulus of needle bearings 40 is placed between the bearing sleeve 38 and the trunnion shaft 36 to allow relatively frictionless rotation of the bearing sleeve with respect to the trunnion shaft. A thrust button 42 is mounted in the end of the trunnion shaft 36, the thrust button having a depending shaft portion 44 received in the opening 46 in the trunnion shaft. A belleville spring 48 acting between the thrust button 42 and the trunnion shaft 36 biases the thrust button 42 in an outward direction.

The thrust button is formed to include an inner bearing race 50 which receives a plurality of ball bearings 52. A bearing cap 54 is received about the post 56 extending from the thrust button 42, the bearing cap being formed at its under-side to include an outer race 58 for the ball bearings 52. It may be seen that the bearing cap 54 is free to rotate with relatively little friction with respect to the bearing cap 42 and the trunnion shaft 36.

The universal joint housing as viewed in Figure 2 is shown to include an outer wall 60 having a cam surface 62 formed along the length thereof. The bearing cap 54 is adapted to bear against the cam surface 62 such that point contact is provided at the point 64. The belleville spring 48 biases the thrust button and bearing cap into engagement with the cam surface 62 in the outer wall 60.

Axial movement of the shaft 18 and the trunnion and bearing assembly 24 with respect to the housing 14 will cause the bearing cap 54 to rotate about the thrust button 42 and on the ball bearings 52, establishing line contact between the cam surface 62 and the bearing cap 54. Thus, there is relatively little wear taking place between the bearing cap and the housing outer wall 60.

Figure 3:
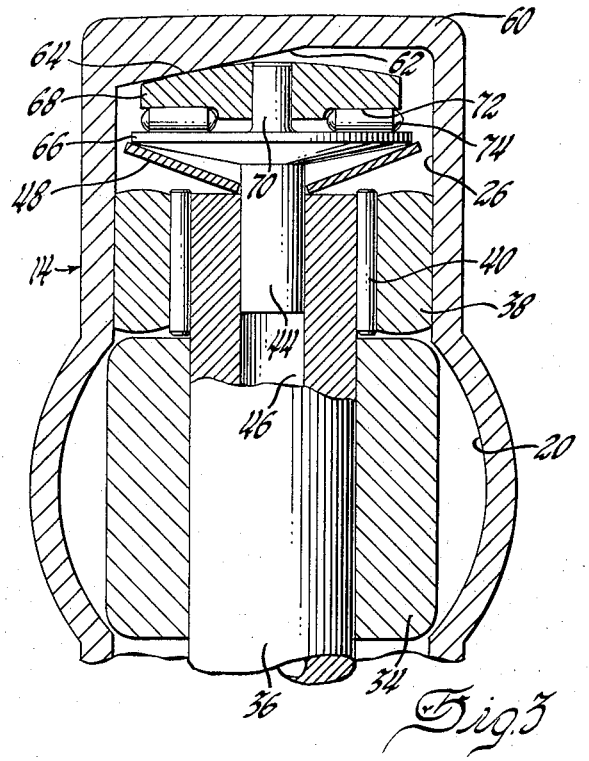
Figure 3 is a cross sectional view of the joint shown in Figure 1 and illustrating a modification of the trunnion and bearing assembly.

Figure 3 shows a modification of the trunnion and bearing assembly in which the trunnion shaft 36 is shown mounted in the enlargement 34 of the shaft 18. The bearing sleeve 38 and annulus of needle bearings 40 are disposed about the end of the trunnion shaft 36 and within the bearing receiving opening 26. The thrust button 66 has depending therefrom a shaft portion 44 which is received in the opening 46 in the trunnion shaft 36. A belleville spring 48 biases the thrust button in an outward direction. The bearing cap 68 is received over a post 70 extending from the thrust button 66 and has an annular groove 72 formed therein to serve as a race for a plurality of roller bearings 74. The bearings allow relatively frictionless rotation of the cap 68 with respect to the thrust button 66, upon relative axial movement between the shaft and trunnion and bearing assembly with respect to the housing 14. The cam surface 62 establishes point contact when stationary or line contact when moving between the outer wall 60 of the housing and bearing cap 68.

Figure 4:
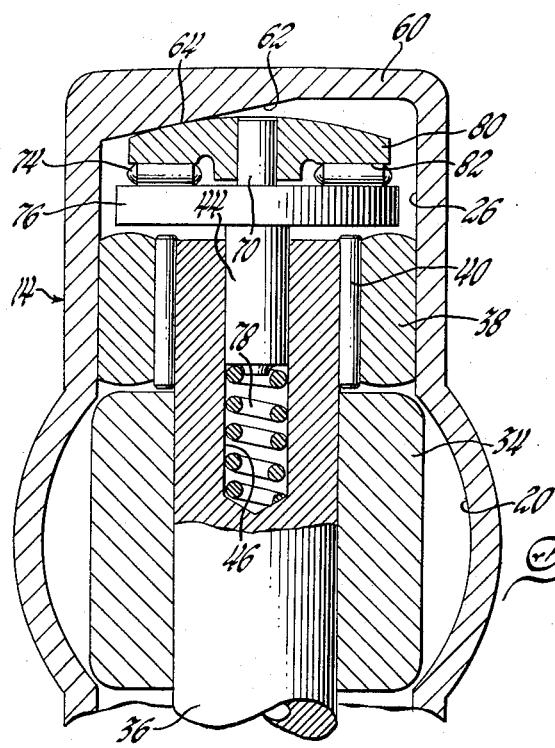
Figure 4 is a cross sectional view of the universal joint shown in Figure 1 and illustrating a further modification of the trunnion and bearing assembly.

A further modification of the trunnion and bearing assembly is illustrated in Figure 4 in which the trunnion shaft 36 is shown extending through the enlargement 34 in the shaft member 18. A bearing sleeve 38 and annulus of needle bearings 40 are disposed within the bearing receiving openings 26 in the housing 14. A thrust button 76 has a shaft portion 44 depending therefrom and extending into the opening 46 in the trunnion shaft 36. A coil spring 78 inserted in the bore 46 and bearing against the shaft portion 44 biases the thrust button 76 in the outward direction. A bearing cap 80 has an annular groove 82 formed therein to act as a rest for a plurality of roller bearings 74. The cam surface 62 formed in the outer wall 60 of the housing 14 provides for line or point contact between the bearing cap 80 and the housing 14 upon relative movement between the housing and the trunnion and bearing assembly.

With a construction of the type described, it may readily be seen that wear in the bearing cap is decreased over the generally available universal joints. A great deal of friction is eliminated since the bearing caps are free to rotate rather than slide against the surface of the outer wall of the joint housing.

I claim:

1. In a universal joint housing having a shaft receiving opening and spaced bearing assembly receiving openings therein, said shaft receiving opening being axially disposed with respect to said housing, a shaft receivable in said housing and in said shaft receiving opening, a trunnion transversally secured in said shaft and within said housing, a bearing assembly mounted on each end of said trunnion and extending into said bearing receiving openings, each of said bearing receiving openings having an outer surface formed for point contact engagement with said bearing assembly therein to allow said bearing assembly to rotate about said trunnion and along said outer surface on relative movement between said bearing assembly and said housing to decrease the friction between said bearing assembly and said housing.

2. In a universal joint a housing having a shaft receiving opening and a pair of spaced bearing assembly receiving openings therein, said shaft receiving opening being axially disposed with respect to said housing, a shaft receivable in said housing and within said shaft receiving opening, a trunnion transversally secured in the end of said shaft within said housing, a bearing assembly rotatably secured on each end of said trunnion and within said bearing assembly receiving openings, a thrust button rotatably mounted in each end of said trunnion and engaging the outer walls of said bearing receiving openings, the outer wall of each of said bearing receiving openings being formed with a cam surface for point contact engagement with said thrust button to allow said thrust button to rotate during movement of said shaft and said trunnion and said thrust button wih respect to said housing.

3. In a universal joint having a housing with a shaft receiving opening and bearing assembly openings therein, a trunnion and bearing assembly comprising a trunnion adapted to be secured in the end of a shaft extending into said housing, a bearing sleeve disposed about each end of said trunnion and engageable with the side walls of said bearing receiving openings, an annulus of needle bearings about each end of said trunnion and between said bearing sleeves and said trunnion for relatively frictionless rotation of said bearing sleeves about said trunnion, a thrust button received in each end of said trunnion and extending therefrom, spring means acting between said trunnion and said thrust buttons to bias said thrust buttons in an outward direction, a bearing cap rotatably mounted on each of said thrust buttons and engageable with the outer walls of said bearing receiving openings, and bearing means disposed between said bearing caps and said thrust buttons to allow relatively frictionless rotation of said bearing caps about said thrust buttons and within said bearing receiving openings.

4. In a universal joint having a housing and a shaft receivable therein, a trunnion and bearing assembly receivable in the end of said shaft within said housing and comprising a trunnion, a bearing sleeve received about each end of said trunnion, an annulus of needle bearings disposed between each of said bearing sleeves and said trunnion to allow relatively frictionless rotation of said bearing sleeves with respect to said trunnion, a thrust button received in each end of said trunnion and outwardly extending therefrom, a belleville spring disposed between said trunnion and said thrust button to bias said thrust buttons in an outward direction, a bearing cap rotatably mounted on each of said thrust buttons, and a plurality of ball members disposed between said bearing caps and said thrust buttons to allow relatively frictionless rotation of said bearing caps with respect to said thrust buttons with movement of said trunnion and bearing assembly within said housing.

5. In a universal joint having a housing and a shaft receivable therein, a trunnion and bearing assembly receivable in the end of said shaft within said housing and comprising a trunnion, a bearing sleeve received about each end of said trunnion, an annulus of needle bearings disposed between each of said bearing sleeves and said trunnion to allow relatively frictionless rotation of said bearing sleeves with respect to said trunnion, a thrust button received in each end of said trunnion and outwardly extending therefrom, a belleville spring disposed between said trunnion and said thrust button to bias said thrust buttons in an outward direction, a bearing cap rotatably mounted on each of said thrust buttons, and a plurality of needle bearings disposed between said bearing caps and said thrust buttons to allow relatively frictionless rotation of said bearing caps with respect to said thrust buttons with movement of said trunnion and bearing assembly within said housing.

6. In a universal joint having a housing and a shaft receivable therein, a trunnion and bearing assembly receivable in the end of said shaft within said housing and comprising a trunnion, a bearing sleeve received about each end of said trunnion, an annulus of needle bearings disposed between each of said bearing sleeves and said trunnion to allow relatively frictionless rotation of said bearing sleeves with respect to said trunnion, a thrust button received in each end of said trunnion and outwardly extending therefrom, a coil spring disposed between said trunnion and said thrust button to bias said thrust buttons in an outward direction, a bearing cap rotatably mounted on each of said thrust buttons, and a plurality of needle bearings disposed between said bearing caps and said thrust buttons to allow relatively frictionless rotation of said bearing caps with respect to said thrust buttons with movement of said trunnion and bearing assembly within said housing.

7. In a universal joint a housing having a shaft receiving opening and a pair of spaced bearing receiving openings therein, said openings having axes parallel to the axis of said housing, a shaft receivable in said housing and within said trunnion receiving opening, a trunnion transversally disposed in the end of said shaft within said housing, a bearing sleeve about each end of said trunnion and engaging the side walls of said bearing receiving openings, an annulus of needle bearings between each of said bearing sleeves and said trunnion to permit relatively frictionless rotation of said bearing sleeves about said trunnion on relative movement between said shaft and said trunnion and said housing, a thrust button mounted in each end of said trunnion and extending outwardly therefrom, a bearing cap rotatably mounted on each of said thrust buttons, bearing means between said bearing caps and said thrust buttons to permit relatively frictionless rotation of said bearing caps with respect to said thrust buttons, the end wall of each of said bearing receiving openings having an inclined cam surface for point contact engagement with said bearing cap disposed in said opening to permit relatively frictionless movement of said bearing cap along said end wall during relative movement between said trunnion and said shaft within said housing, and spring means between said trunnion and said thrust button to bias said thrust button and said bearing cap into engagement with said end wall of said bearing receiving opening.

References Cited in the file of this patent
UNITED STATES PATENTS

| | | |
|---|---|---|
| 1,921,274 | Warner | Aug. 8, 1933 |
| 2,722,115 | Dunn | Nov. 1, 1955 |
| 2,755,641 | Dunn | July 24, 1956 |